Patented Aug. 9, 1927.

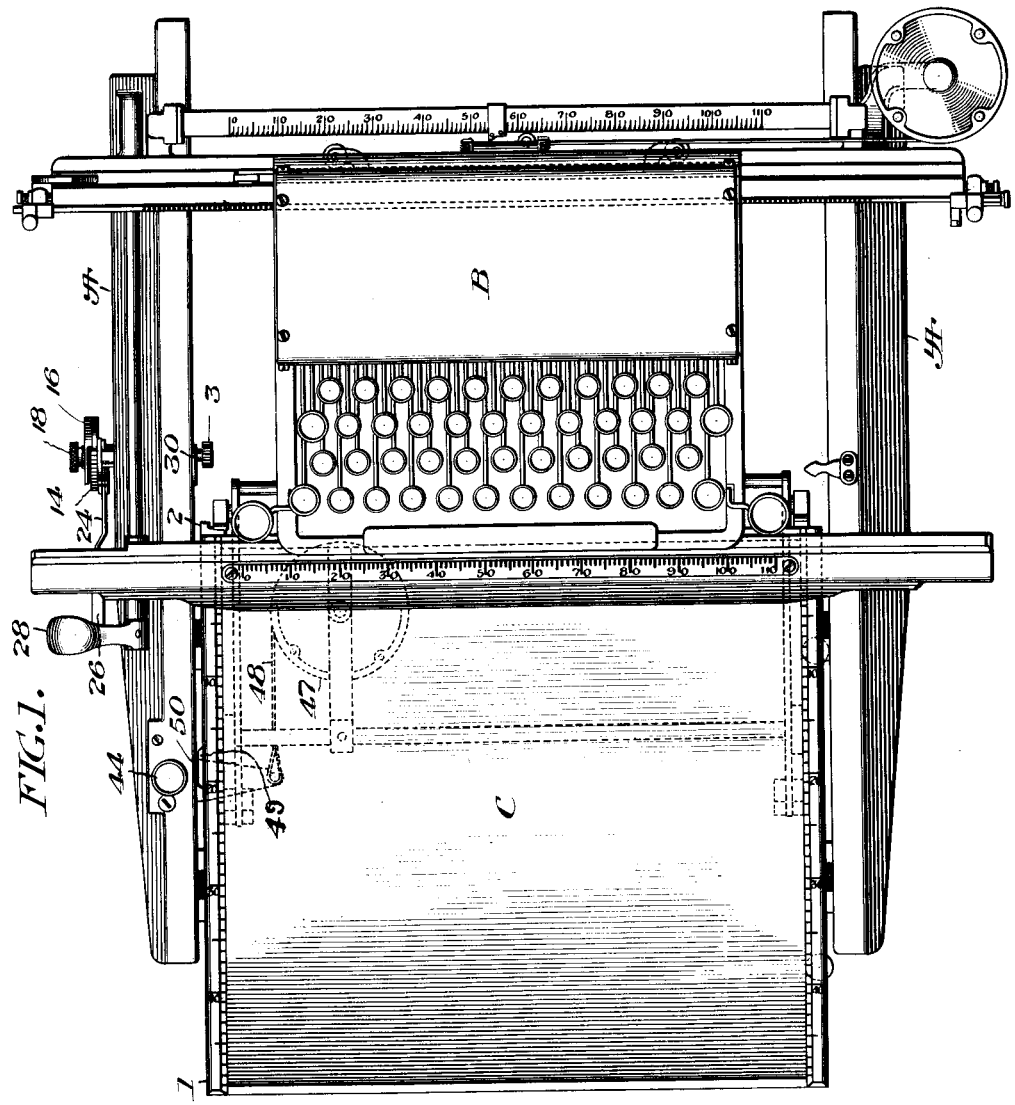

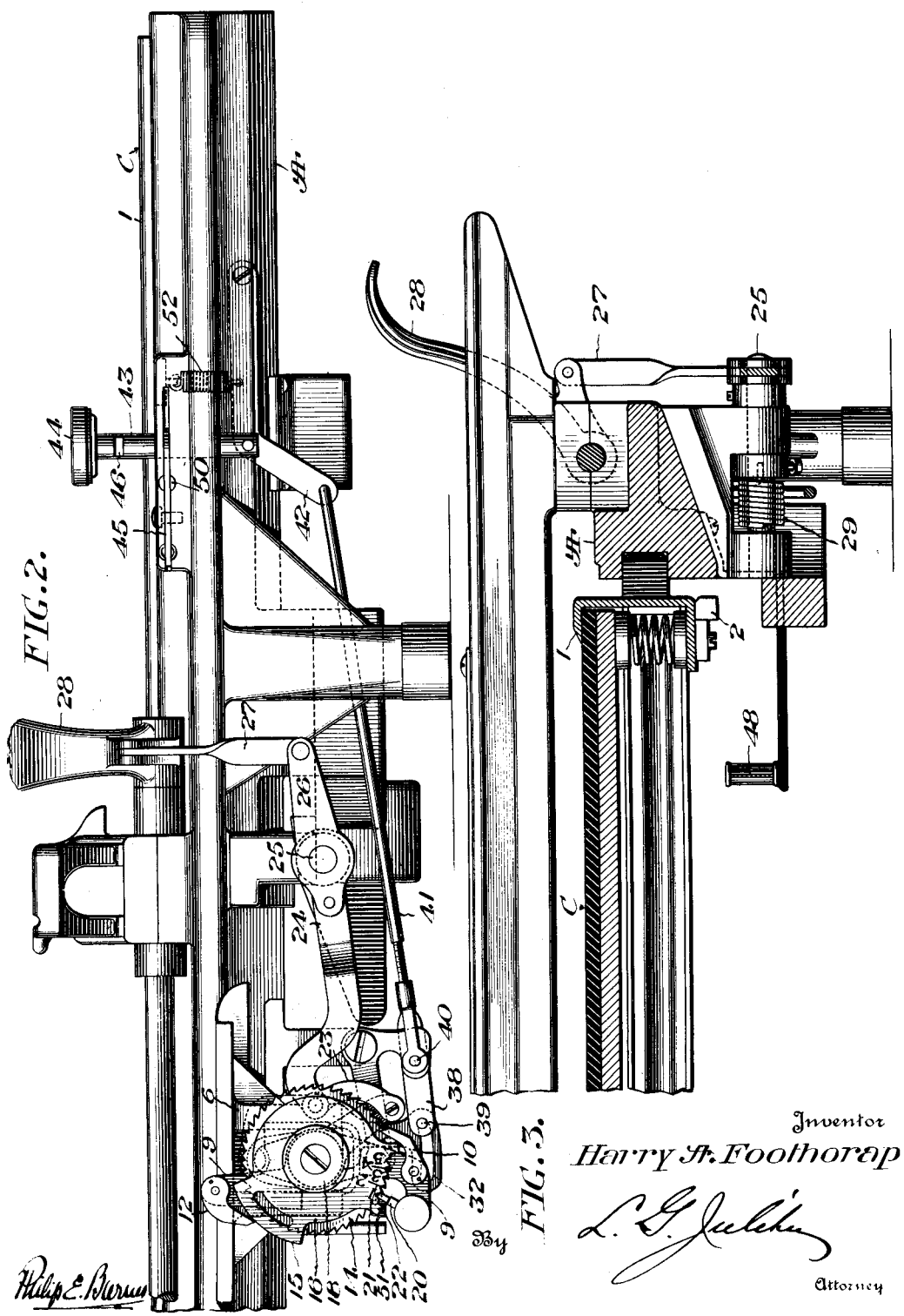

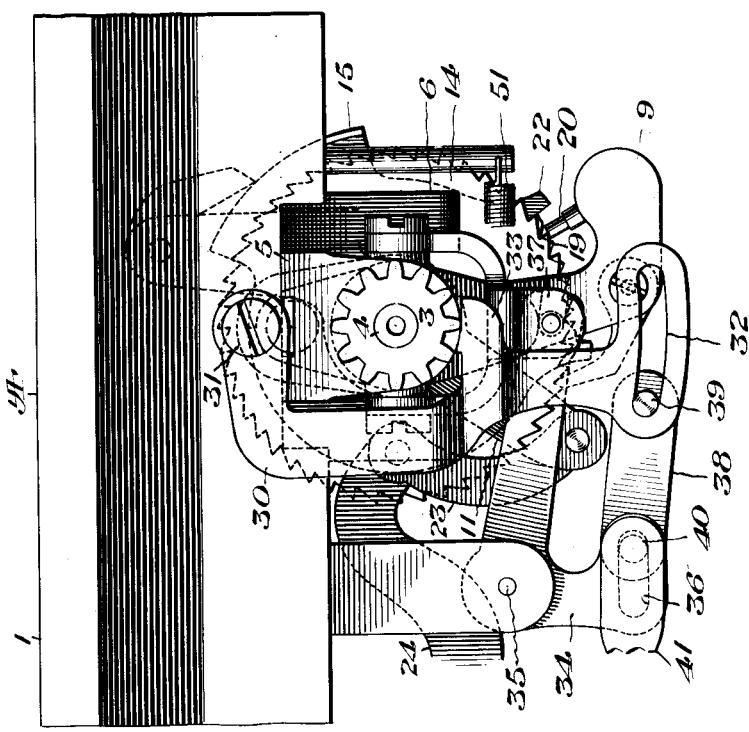
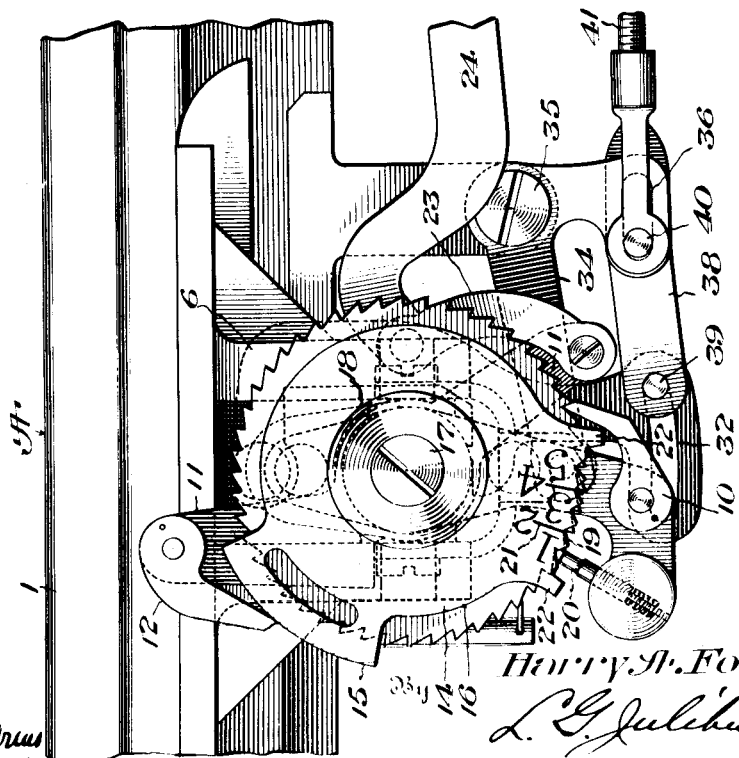

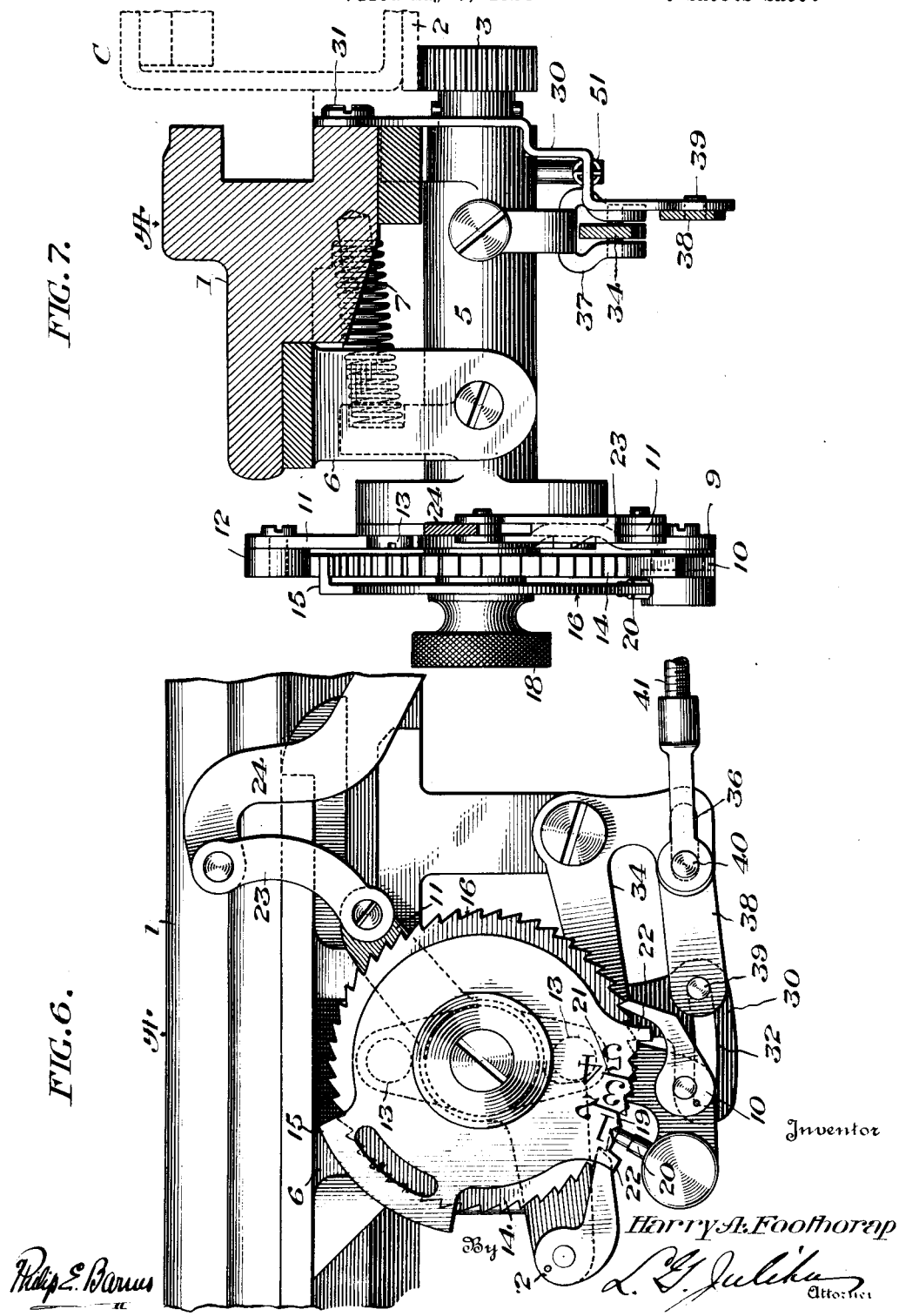

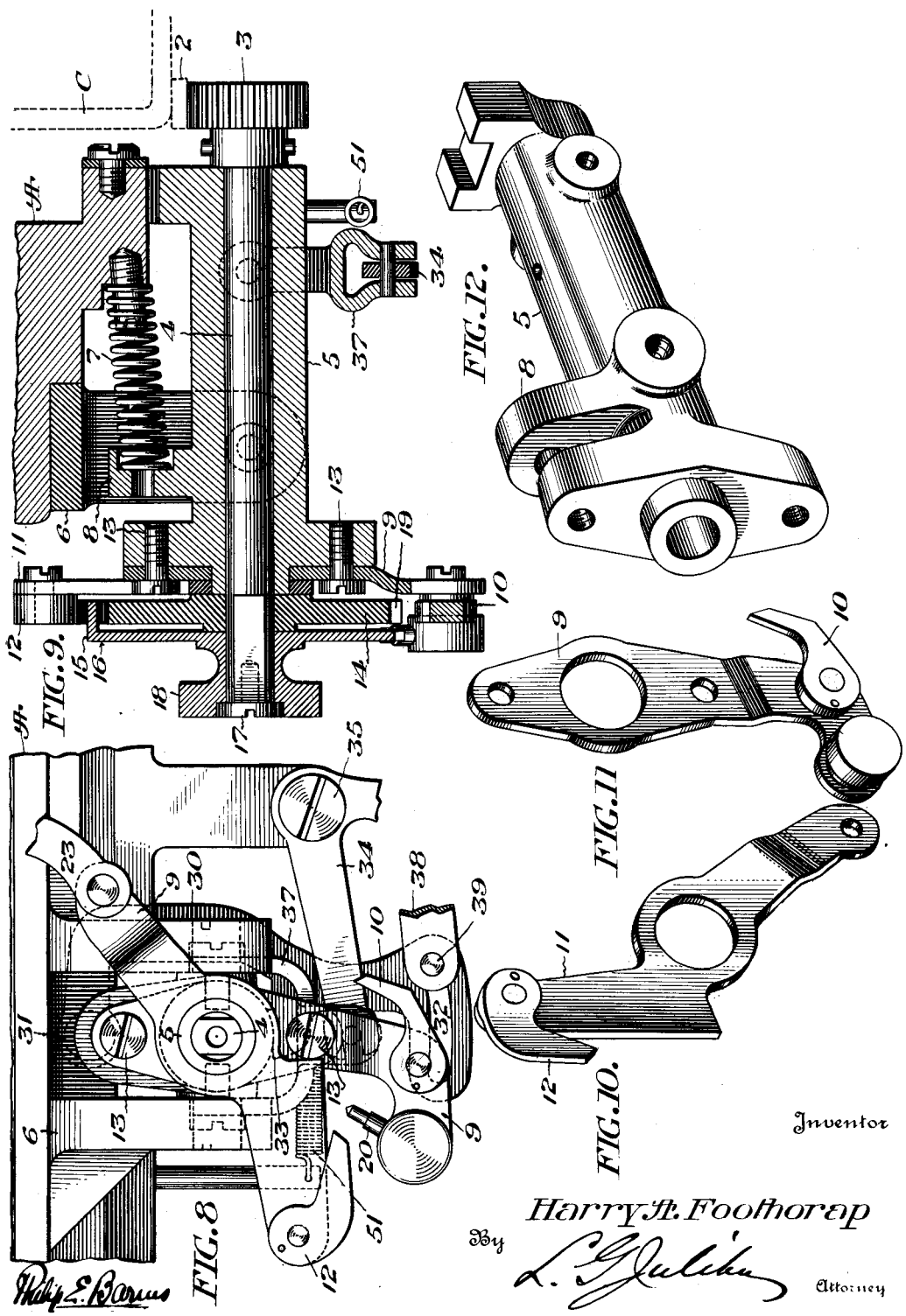

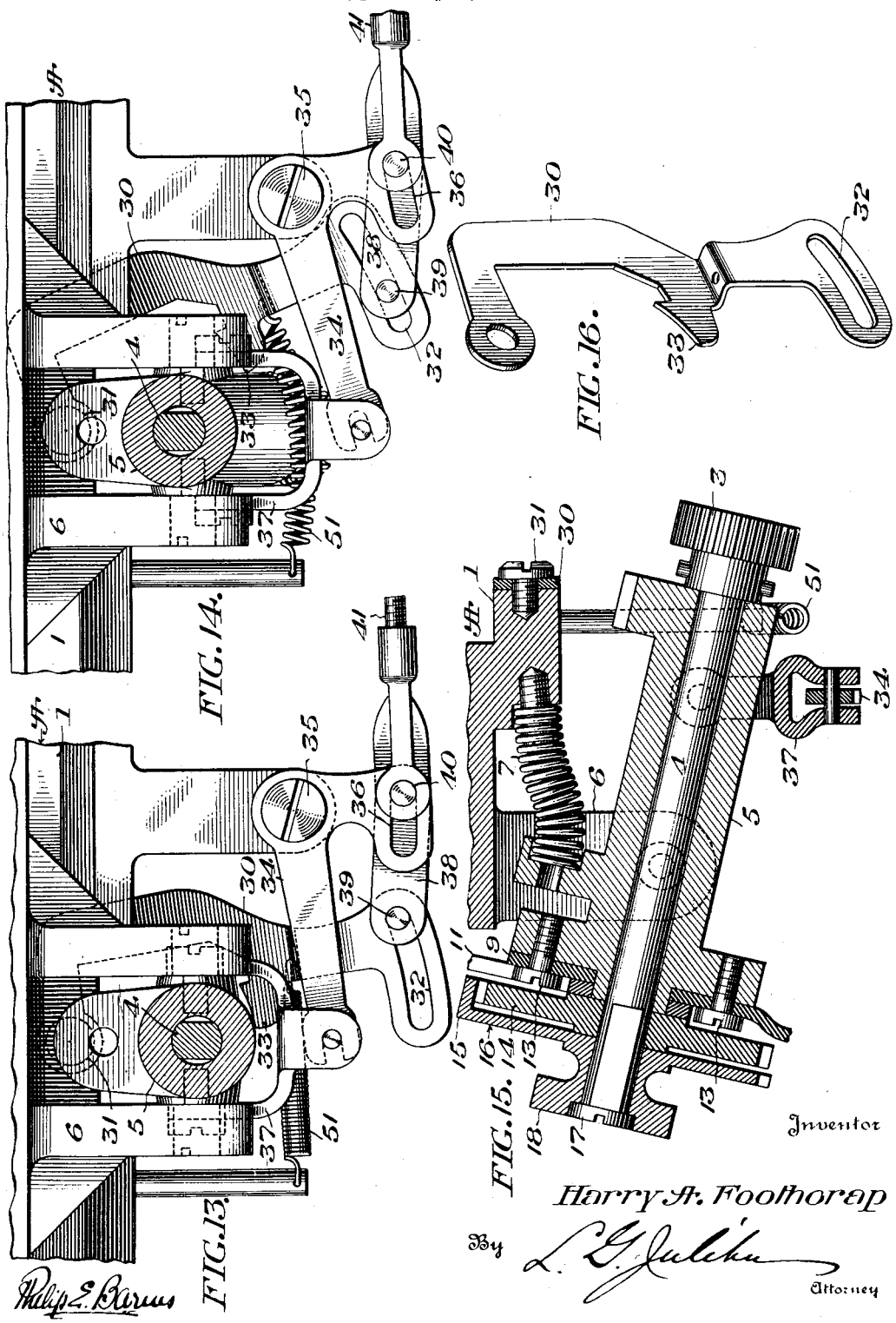

1,638,191

UNITED STATES PATENT OFFICE.

HARRY A. FOOTHORAP, OF HARRISBURG, PENNSYLVANIA, ASSIGNOR TO ELLIOTT-FISHER COMPANY, A CORPORATION OF DELAWARE.

LINE-SPACING MECHANISM.

Application filed May 3, 1924. Serial No. 710,806.

This invention relates to line spacing mechanism for flat platen typewriters.

The object of the invention is to provide an efficient variable line spacing mechanism whereby variable line spacing of a movable flat platen and its release for free movement may be effected.

To the accomplishment of this object and others subordinate thereto the invention resides in the construction and arrangement of parts to be hereinafter described.

In the accompanying drawings:

Fig. 1 is a plan view of a flat platen typewriter equipped in accordance with my invention.

Fig. 2 is a side elevation of a portion of the structure showing the relation thereto of the line spacing mechanism.

Fig. 3 is a transverse section showing the platen mounting and a part of the line spacing mechanism.

Figs. 4 and 5 are elevations of the line spacing mechanism on a somewhat enlarged scale, the parts being shown in normal position.

Fig. 6 is a view similar to Fig. 4 with the parts in operated position.

Fig. 7 is an elevation, partly in section, of the structure shown in Fig. 6.

Fig. 8 is a view similar to Fig. 6 with certain of the parts removed.

Fig. 9 is a vertical section through the structure shown in Fig. 7.

Fig. 10 is a detail perspective view of the spacing pawl and its carrier.

Fig. 11 is a similar view of the check pawl and its carrier.

Fig. 12 is a detail perspective view of the pivoted bearing sleeve.

Fig. 13 is a sectional elevation showing, more particularly, the mechanism for swinging the bearing sleeve.

Fig. 14 is a similar view with the sleeve swung down to effect the platen release.

Fig. 15 is a view similar to Fig. 9 with the bearing sleeve in the releasing position, and Fig. 16 is a detail perspective view of the latch lever.

Slidably mounted in a stationary main frame A which supports a transversely movable typewriter carriage B is a flat platen C movable back and forth in the frame A. The rearward movement of the platen C effects the line spacing of a record printed on a sheet supported by the platen and letter spaced by the movement of the carriage B.

My present invention is primarily concerned with the means whereby the line spacing of the platen and its release from the line spacing means is effected.

The platen C is supported in a frame 1 slidable in the main frame A, as already stated, and carrying below one edge thereof a line spacing rack 2 engaged by a line space pinion 3 fixed at one end of a line space shaft 4 disposed transversely with respect to the platen and afforded a bearing in a bearing sleeve 5. The sleeve 5 is tiltably mounted in a sleeve supporting bracket 6 pendant from one of the side members of the frame A, the axis of movement of said sleeve being at right angles to the shaft 4 and intermediate of the ends of the sleeve. This character of mounting permits the sleeve to be tilted for the purpose of withdrawing the pinion 3 from the rack 2, as shown in Fig. 15. Normally, however, the sleeve is held in its horizontal operative position by a spring 7 interposed between the frame A and a lug 8 upstanding from the sleeve.

At the outer end of the bearing 5 are mounted a fixed carrier 9 for a check pawl 10 and a swinging carrier or lever 11 for a driving pawl 12. Both of these carriers are mounted on an end boss of the bearing sleeve to which, as stated, the carrier 9 is fixed by screws 13 while the carrier 11 swings on the boss as a bearing in a manner to be described.

The pawls 10 and 12 are designed to engage the line space ratchet wheel 14 fixed on the shaft 4 beyond the outer end of the bearing 5 and designed to rotate the shaft when driven by the pawl 12 to rotate the pinion 3 and feed the platen. Normally, however, the driving pawl is held out of the ratchet 14 by a segmental pawl guard 15 formed on what may be termed a line space regulator or setting member 16 rotatably mounted on the shaft 4 and retained by a headed screw 17. To facilitate the turning of the setting or selection member 16 it is formed with a knob 18, as shown. At a point removed from the guard 15 the member 16 is provided with a series of peripheral notches 19 any one of which may be engaged by a spring urged retaining plunger 20 carried by the fixed pawl carrier 9. Opposite the notches 19 is a line space scale 21 indicating different line spacings according to the position of the pawl guard 15, as indicated by the particular notch of the setting member 16 engaged by the plunger 20. Stops 22 located at opposite ends of the scale 21 coact with the plunger to limit the selective movement of the setting member.

By reference to Fig. 4 it will be seen that the driving pawl rests on and traverses the guard 15 during the initial movement of the pawl carrier. The extent of this idle or lost movement will obviously depend on the position of the guard as determined by the position of the setting member 16. As the extent of the effective or driving movement of the pawl is likewise determined it follows that the extent of the line spacing movement may be varied by rotating and setting the member 16 according to the scale designations thereon.

To impart driving or line spacing movement to the pawl 12 the opposite end of its carrier 11 is connected by a link 23 to the rear end of an arm 24 carried by a shaft 25 mounted on the frame A and having a forwardly extending arm 26 connected by a link 27 to a line space lever 28. A spring 29 coiled on the shaft 25 tends to return the parts to normal or retracted position. When the lever 28 is depressed by the operator the driving pawl 12 is advanced until it reaches the end of the guard and drops into the ratchet, continued movement serving to rotate the ratchet and to feed the platen rearwardly to an extent determined by the position of the guard.

The tiltable mounting of the bearing sleeve 5 in the support 6 permits said sleeve to be swung out of normal position shown in Fig. 9 to the released position shown in Fig. 15, for the purpose of disconnecting the pinion 3 from the rack 2 and thus releasing the platen from the control of the line spacing mechanism. Normally however the spring 7 holds the sleeve in its horizontal or operative position and this position of the sleeve is further insured by a bearing latch 30 in the form of a lever fulcrumed at its upper end as indicated at 31, formed at its lower end with an arcuate slot 32 and provided at an intermediate point with a bearing or sleeve support 33 which extends under and positively retains the sleeve 5 in its normal position (see Fig. 5).

To effect the tilting or release of the line spacing mechanism against the resistance of the spring 7 when the latch 30 is in position to permit such movement, a shifting or tilting lever 34 of bell crank form is fulcrumed on the frame A as indicated at 35. At one end of this lever 34 is formed a horizontal slot 36 while its opposite end is pivoted to a yoke 37 pivoted in turn to the sleeve 5 adjacent to its inner end. The slotted ends of the latch lever 30 and the shifting lever 34 are connected by a link 38 having pins 39 and 40 projected into the slots 32 and 36 at the adjacent ends thereof in the normal position of the parts (see Fig. 4).

Connected to the pin 40 is a draw rod 41 connected at its opposite end to a lever 42 fulcrumed at one end on the frame and connected at an intermediate point to the stem 43 of a release key 44.

By reference to Figs. 4 and 5 it will be seen that movement of the draw rod 41 upon the depression of the release key will first cause the pin 39 to swing the latch lever 30 to the position shown in Fig. 13 withdrawing the support 33 beyond the center of the sleeve 5. Continued movement of the draw rod will continue the movement of the latch lever 30 but as the pin 40 will have traversed the slot 36 in the shifting lever the latter will be swung to draw down the inner end of the sleeve 5 and disengage the pinion 3 from the rack.

In this shifted or released position the parts are retained by a spring urged lock 45 which engages a notch 46 in the stem of the release key.

When the released platen has been retracted to its forward position by the spring drum 47 through the medium of the tape 48 an unlocking cam 49, movable with the platen, will engage a pin 50 and move the same to swing the lock 45 away from the key stem and unlock the parts and permit the return thereof to engaging or platen controlling position through the medium of the several retracting springs, to-wit: the spring 7 described, a spring 51 connected to the latch lever 30 (Fig. 13) and a spring 52 connected to the lever 42, as shown in Fig. 2.

What I claim is:

1. The combination with a power returned platen having a line spacing rack of a shaft having a pinion thereon to drive the rack, means for driving the shaft to positively feed the platen and means for tilting the shaft to move the pinion into and out of engagement with the rack.

2. The combination with a platen having a rack, of a tiltable shaft having a pinion, means for tilting the shaft to engage and disengage the rack and pinion and a latch for retaining the shaft in one position.

3. The combination with a platen having a rack, of a tiltable shaft having a pinion, means for tilting the shaft to engage and disengage the rack and pinion, a latch for retaining the shaft in one position and means for operating the latch.

4. The combination with a platen having a rack, of a tiltable shaft having a pinion, means for tilting the shaft to engage and disengage the rack and pinion, a latch for retaining the shaft in one position and an operating device common to both the latch and the shaft tilting means.

5. The combination with a stationary frame including right angularly related guides, of a recording carriage and a platen movable in said guides in right angularly related paths, a motor for moving the platen in one direction, line spacing mechanism for the platen, and means for rendering the line spacing mechanism effective and ineffective, said means including a device operated by the movement of the platen.

6. The combination with a stationary frame including right angularly related guides, of a recording carriage and a platen movable in said guides in right angularly related paths, a motor for moving the platen in one direction, line spacing mechanism for the platen, and means for rendering the line spacing mechanism effective and ineffective, said means including a member manually operated in one direction and movable automatically in another direction under the control of the platen.

7. The combination with a stationary frame, of a flat platen movable therein, a motor for moving the platen in one direction, variable line spacing mechanism for moving the platen in the opposite direction against the resistance of the motor, means for disconnecting the line spacing mechanism from the platen, and means under the control of the platen for restoring the connection.

8. The combination with a stationary frame, of a flat platen movable therein, a motor for moving the platen in one direction, variable line spacing mechanism for moving the platen in the opposite direction against the resistance of the motor, hand operated means for disconnecting the line spacing mechanism from the platen, and automatic means for restoring the connection.

9. The combination with a frame and a flat platen movable therein, of a motor carried by the platen and tending to move the same in one direction, variable line spacing mechanism including a rack and pinion for moving the platen in the opposite direction, means for disconnecting the rack and pinion to release the platen for movement by the motor, and means operated by such movement of the platen to reengage the rack and pinion.

10. In combination, a frame, a flat platen movable therein, line spacing mechanism comprising driving and driven members one of which is mounted to oscillate relative to the other to engage or disengage the same, devices for holding the oscillating member in engaged position, and means for moving said oscillating member to its disengaged position and operative to first release the holding devices.

11. In combination, a frame, a flat platen having a forward and return movement therein, variable line spacing drive mechanism for moving the platen in one direction, a motor drive for moving the platen in the opposite direction, means for rendering one drive ineffective to permit the platen being driven by the other and automatic means for placing the platen, after movement thereof, under the control of the previously ineffective drive.

12. The combination with a frame and platen, of a driving shaft geared at one end to the platen, variable line spacing mechanism at the opposite end of the shaft, a tiltable bearing sleeve for the shaft, and means for tilting the sleeve to control the connection between the shaft and platen.

13. The combination with a frame and platen, of a driving shaft geared to the platen, a tiltable bearing sleeve for the shaft, a driving arm mounted on the sleeve, a pawl carried by the arm, a driving ratchet fixed to the shaft, and a pawl guard carried by the shaft and adjustable to determine the extent of the driving engagement between the pawl and ratchet.

14. The combination with a movable platen, of line spacing mechanism including a tiltable driving shaft normally geared to the platen, means for locking the shaft in normal position, and means for first unlocking the shaft and then tilting the same to disconnect the shaft and platen.

In testimony whereof I hereunto affix my signature.

HARRY A. FOOTHORAP.